Patented Nov. 23, 1926.

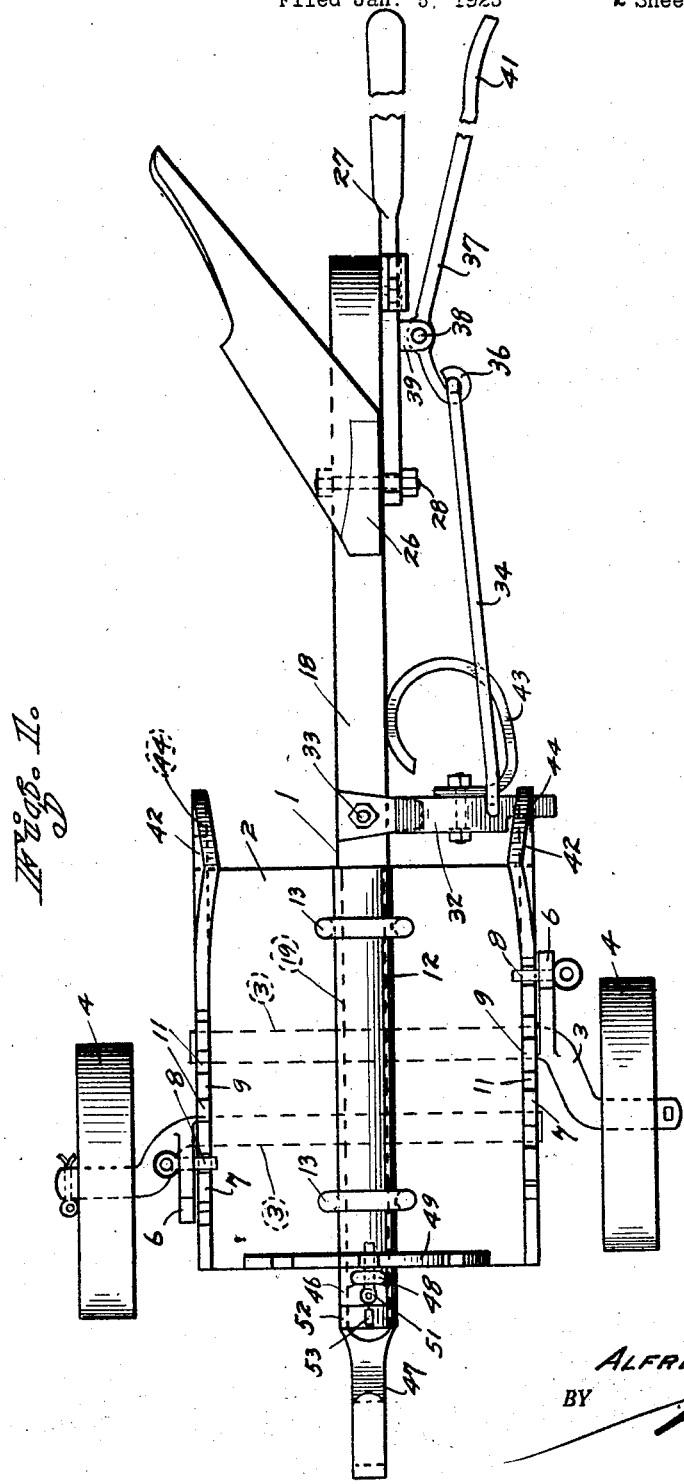

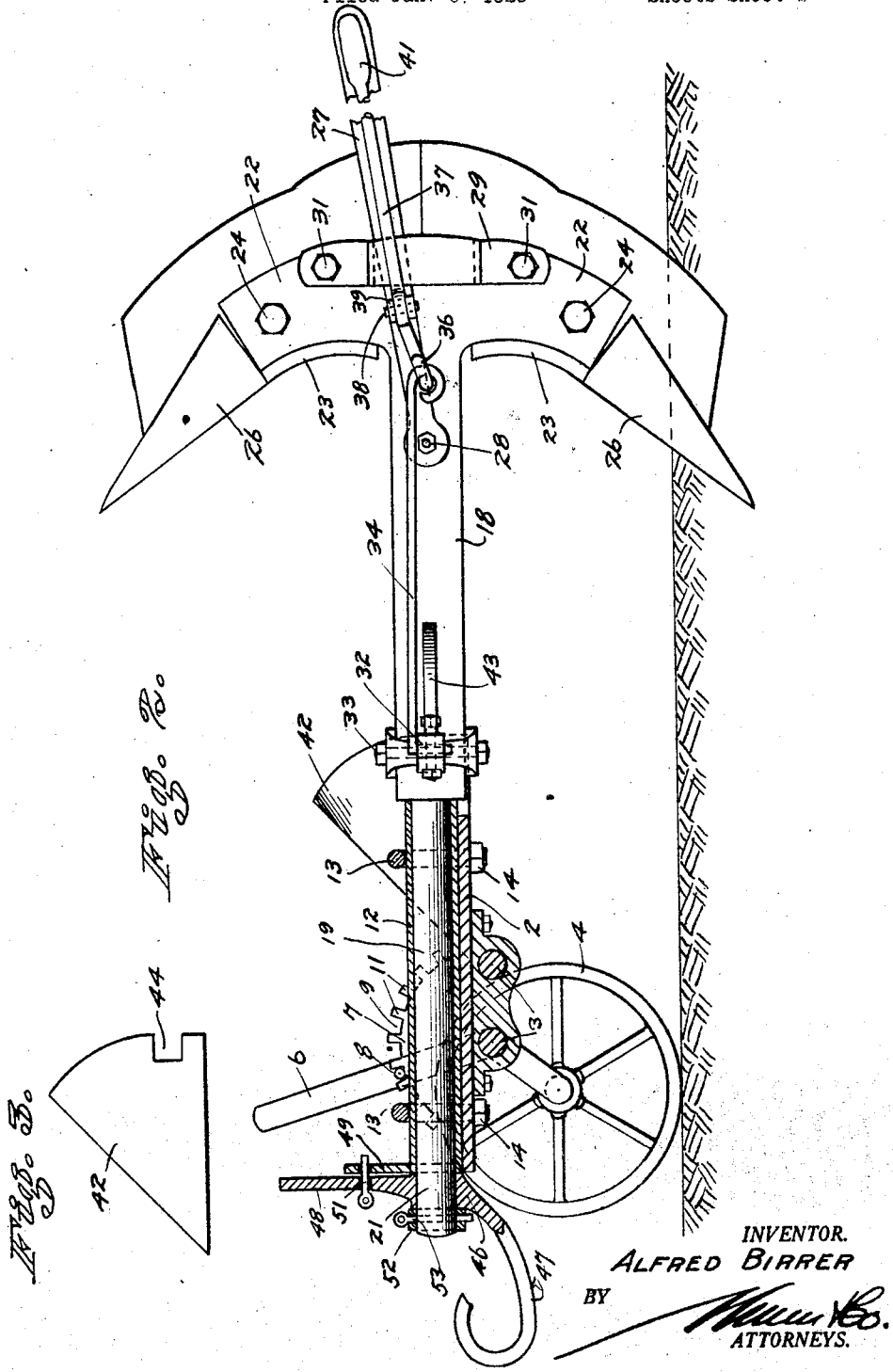

1,608,198

UNITED STATES PATENT OFFICE.

ALFRED BIRRER, OF BURNEY, CALIFORNIA.

REVERSIBLE PLOW.

Application filed January 5, 1925. Serial No. 631.

The present invention relates to improvements in reversible plows and its particular object is to provide a plow at the rear end with shares extending in opposite directions in such a manner that either of the shares may be used and that one of them throws a right hand furrow while the other throws a left hand furrow. Reversible plows of this character are particularly useful in the cultivation of hillsides where it is impossible to encircle a field and work from the periphery to the center in continuous travel due to the contour of the land. When an ordinary plow is used under these circumstances, the operator can plow only one way and after arriving at the end has to turn around and return to the place of commencement without drawing a furrow. With my plow it is possible to reverse the shares at the end so that the operator may throw a right hand furrow on one trip and a left hand furrow on the return trip, thus omitting any idling.

Particular features of my arrangement are its simplicity, the easy manner in which reversal may be effected, a drawing attachment which is adjustable and is particularly designed for establishing a correct line of draft, and independent adjusting means for each wheel allowing the angularity of the plow relative to the hillside to be corrected for the obtaining of best results.

Further objects and advantages of my device will appear as the specification proceeds.

The preferred form of my invention is illustrated in the accompanying drawings, in which—

Figure 1 shows a top plan view of my plow.

Figure 2 a side elevation of the same, a portion being shown in longitudinal section, and Figure 3 a detail view of a cam used in my plow.

While I have shown only the preferred form of the invention, it should be understood that various changes or modifications may be made within the scope of the claim hereto attached without departing from the spirit of the invention.

My reversible plow 1 comprises a platform 2 preferably rectangular which is supported on two parallel crank axles 3. The latter have their extremities pivoted in the wheels 4 and have arms 6 extending therefrom exteriorly of the platform and adapted to slide along sectors 7 to which they may be secured in selected places by means of pins 8 extending into spaces 9 formed between teeth 11 of the sectors.

On the platform there is mounted in a longitudinal direction a long sleeve 12 arranged preferably centrally relative to the platform and held in place by means of clamps 13 which latter are secured to the platform by nuts 14. A beam 18 has a rounded portion 19 rotatably disposed within the sleeve 12 and extends forwardly of the platform through a short distance as shown at 21 and rearwardly of the platform for a considerable distance. The rear end of the beam 18 terminates in two oppositely extending holding plates 22 to which are attached mold boards 23 by means of bolts 24. Plowshares 26 are secured to the moldboards in any suitable manner and are arranged so that one of them when engaging with the ground surface throws a right hand furrow while the other when substituted for the former throws a left hand furrow. A handle 27 pivoted to the beam, as shown at 28, and extending rearwardly beyond the beam is guided to swing parallel thereto by a clip 29 fastened to the rear end of the beam, as shown at 31.

For revolving the beam 18 in its bearing 12 I provide an arm 32 which is pivoted to the beam at 33 in operative proximity to the rear edge of the platform 2. A link 34 extends rearwardly from the free end of the arm 32 and is engaged by the short end 36 of a bellcrank lever 37, the fulcrum 38 of which is pivoted between lips 39 extending from the handle 27 and the free end 41 of which extends rearwardly in adjacent relation to the handle 27 so that a human hand may span both of them to force the free end of the bellcrank lever toward the handle for drawing in the arm 32, so that the latter is made to clear the cams 42 extending rearwardly from the side edges of the platform, while a strong spring 43 bearing on the back face of the arm 32 opposes this action and urges the arm into frictional engagement with the cams 42 and into notches 44 provided in the cams whereby the beam is locked against rotary motion.

The front end of the beam 18 has the base 46 of a hook 47 pivoted thereto, the hook being arranged that its point of engagement by a drawing agent is spaced from the axis of the beam so that a somewhat lateral pull is exercised. A projection 48 extends beyond the base of the hook in an opposite direction and slides past a sector 49 secured on the front end of the platform to which the projection 48 may be secured in a number of selected positions by means of a pin 51 passing through registering perforations. A small sleeve 52 at the extreme end of the beam is secured thereto by means of a pin 53 and prevents the hook from sliding off.

The advantages of my reversible plow will be readily understood from the foregoing description. The operator having reached the end of the field after throwing a right hand furrow turns around and shifts his plows for a left hand furrow so that he may return along the first thrown furrow for adding a second furrow to the same. To effect the reversal he merely presses the free end 41 of the bellcrank lever 37 toward the handle 27 and then revolves the beam which has become possible by the disengagement of the arm 32 from the notch in the cam 42. The operator swings the plows around through nearly half a revolution until the arm 32 strikes the other cam 42 and is forced into the notch thereof by the spring 43. To adjust the position of the platform relative to the wheels, the operator manipulates the handles 6 thereby turning the crank axles 3 which allows him to raise or lower either side of the platform. On hillsides it is very important that the direction of the pull can be carefully adjusted and changed as conditions change. For this reason the use of my particular hook in connection with my reversible plow is very important since the same allows the operator to set the hook at any angle relative to the platform and to thereby give to the plow the direction of pull best adapted for the particular contour and most advantageous in the economy of power.

I claim:

A reversible plow having a platform, traction wheels connected thereto for independent vertical adjustment, an open-ended sleeve rigidly mounted longitudinally of the platform, a plow beam having a forward end portion revolvably mounted in the sleeve and a rear end portion provided with two plowshares, the said plowshares being rigidly secured to the rear end portion of the beam and arranged in opposing relation, means for locking the beam against rotation when one of the plowshares is in ground engaging position, a draft attachment revolvable on the front end portion of the beam beyond the sleeve and having an engaging end angularly adjustable in a vertical plane with respect to the axis of the beam and offset from the said axis, and cooperating devices carried by the draft attachment and by the sleeve for securing the draft attachment in any of its adjusted positions, the said device including a perforated sector carried by the sleeve and a perforated radially disposed arm carried by the draft attachment and a pin insertable into the perforation of the arm and the sector when these are in alinement.

ALFRED BIRRER.